US011409982B2

(12) United States Patent
Ghaderpour et al.

(10) Patent No.: US 11,409,982 B2
(45) Date of Patent: Aug. 9, 2022

(54) REFINED AVERAGE FOR ZONING METHOD AND SYSTEM

(71) Applicant: Farmers Edge Inc., Winnipeg (CA)

(72) Inventors: Ebrahim Ghaderpour, Calgary (CA); Matthew Wright Jensen, Raymond (CA); Guy Dion Duke, Lethbridge (CA); David Robert McCaffrey, Lethbridge (CA)

(73) Assignee: Farmers Edge Inc., Winnipeg (CA)

( * ) Notice: Subject to any disclaimer, the term of this patent is extended or adjusted under 35 U.S.C. 154(b) by 0 days.

(21) Appl. No.: 16/847,184

(22) Filed: Apr. 13, 2020

(65) Prior Publication Data

US 2020/0342227 A1    Oct. 29, 2020

Related U.S. Application Data

(60) Provisional application No. 62/839,100, filed on Apr. 26, 2019.

(51) Int. Cl.
*G06K 9/62* (2006.01)
*A01B 79/00* (2006.01)
(Continued)

(52) U.S. Cl.
CPC ........ *G06K 9/00657* (2013.01); *A01B 79/005* (2013.01); *G06K 9/6267* (2013.01);
(Continued)

(58) Field of Classification Search
CPC ........ G06K 9/00657; G06K 9/42; G06K 9/44; G06K 9/6298; G06K 9/6267; G06T 5/002;
(Continued)

(56) References Cited

U.S. PATENT DOCUMENTS 9,983,041 B1 * 5/2018 Jerphagnon ............ A01G 25/16
2016/0180473 A1 * 6/2016 Groeneveld ......... A01C 21/007
  705/7.25
(Continued)

FOREIGN PATENT DOCUMENTS

CN    101699315    4/2012
CN    109063553    12/2018

OTHER PUBLICATIONS

Reyes, Javier, et al. "Delineating Site-Specific Management Zones and Evaluating Soil Water Temporal Dynamics in a Farmer's Field in Kentucky." Vadose Zone Journal 18.1 (Feb. 2019): 1-19. (Year: 2019).*

(Continued)

*Primary Examiner* — Vu Le
*Assistant Examiner* — Tracy Mangialaschi
(74) *Attorney, Agent, or Firm* — Ryan W. Dupuis; Kyle R. Satterthwaite; Ade & Company Inc.

(57) ABSTRACT

A method for determining management zones within an agricultural field, the method includes selecting a plurality of remotely sensed images of the agricultural field wherein the plurality of remotely sensed images represent a plurality of growing seasons, each of the plurality of remotely sensed images having a vegetation index associated therewith, generating a refined average image from the plurality of remotely sensed images of the agricultural field, and applying a classification method to define management zones associated with the refined average image.

20 Claims, 4 Drawing Sheets

(51) Int. Cl.
    *G06T 5/20* (2006.01)
    *G06K 9/00* (2022.01)
(52) U.S. Cl.
    CPC ...... *G06T 5/20* (2013.01); *G06T 2207/10032* (2013.01); *G06T 2207/30188* (2013.01)
(58) Field of Classification Search
    CPC ..... G06T 5/20; G06T 5/50; G06T 7/11; G06T 2207/10032; G06T 2207/20221; G06T 2207/20032; G06T 2207/30188; A01B 79/005
    See application file for complete search history.

(56) References Cited

U.S. PATENT DOCUMENTS

2018/0189954 A1      7/2018  Albrecht et al.
2018/0293671 A1*    10/2018  Murr ........................ G01W 1/10

OTHER PUBLICATIONS

Poblete, Carlos, et al. "Study of NDVI spatial variability over a Merlot vineyard-plot in Maule Region using a hand held Spectroradiometer." (2009). (Year: 2009).*

Kodinariya, Trupti M., and Prashant R. Makwana. "Review on determining number of Cluster in K-Means Clustering." International Journal 1.6 (2013): 90-95. (Year: 2013).*

Sulik, John J., and Dan S. Long. "Spectral considerations for modeling yield of canola." Remote Sensing of Environment 184 (2016): 161-174. (Year: 2016).*

Christy C.D. 2008. Real-time measurement of soil attributes using on-the-go near infrared reflectance spectroscopy. Comput Election Agric 61:10-19.

De Reu, J. et al. Application of the topographic position index to heterogeneous landscapes, Geomorpholoty, 186 (2013), pp. 39-49.

Fleming, K.L. et al. Evaluating soil color with farmer input and apparent soil electrical conductivity for management zone delineation. Agron. J. (2004) 96:1581-1587.

Jiang, Z. et al (2008). Development of a two-band enhanced vegetation index without a blue band, Remote Sensing of Environment, 112 (10), 3833-3845.

Mulla, D.J. (1991). Using geostatistics and GIS to manage spatial patterns in soil fertility, pp. 336-345. In: G. Kranzler (ed.), Automated Agriculture for the 21st Century. American Society of Agricultural Engineers, St. Joseph, MI.

Mulla, D.J. (1993). Mapping and managing spatial patterns in soil fertility and crop yield, pp. 15-26. In: P. Robert, W. Larson, and R. Rust (eds.), Soil Specific Crop Management. American Society of Agronomy, Madison, WI.

Mulla, D.J. et al. (1997). Key processes for site-specific soil and crop management., pp. 1-18. In F.J. Pierce and E.J. Sadler (ed.) The State of Site-Specific Management for Agriculture. ADS, CSSA, SSSA, Madison, WI.

Rocha, A.V. et al. (2009). Advantages of a two band EVI calculated from solar and photosynthetically active radiation fluxes, Agricultural and Forest meteorology 149 (9), 1560-1563.

Sulik, J.J. et al. (2016). Spectral considerations for modeling yield of canola, Remote Sensing of Environment, 184, 161-174.

* cited by examiner

REFINED AVERAGE FOR ZONING METHOD AND SYSTEM

RELATED APPLICATIONS

This application claims priority to U.S. Provisional Patent Application No. 62/839,100, filed Apr. 26, 2019, entitled "Refined Average for Zoning Method and System", hereby incorporated by reference in its entirety.

FIELD OF ART

The present invention relates to generating a management zone delineation map for an agricultural field. More specifically, but not exclusively, the present invention relates to the use of a refined average method and system for agricultural management zoning using multi-year imaging and ancillary data.

BACKGROUND

Precision agriculture strives to optimize the amount of fertilizer used in crop production. One method of optimizing the fertilizer application is by employing variable-rate fertilization. In variable-rate fertilization, the amount of fertilizer applied across the field varies according to the needs of a plant and/or soil for each particular location. Numerous parameters such as topography, soil texture, water-holding capacity, existing nutrient levels, soil organic matter, and moisture levels determine the fertilizer need at each particular location in a field. One methodology for managing variable-rate fertilization is to divide a field into fertility zones, reflecting areas of relative yield expectations.

A goal of precision farming is to improve site-specific agricultural decision making through collection and analysis of data, formulation of site-specific management recommendations, and implementation of management practices to correct the factors that limit crop growth, productivity, and quality (Mulla and Schepers, 1997). Management zones are used in precision farming to divide field regions that are dissimilar in their requirements for fertilizer, pesticide, irrigation, seeding, or tillage (Mulla, 1991, 1993). Management zones are relatively homogeneous units within the field that vary from one another in their response to fertilizer, irrigation, or other inputs. They can be delineated based on differences in crop yield, soil type, topography, or soil properties (fertility, moisture content, pH, organic matter, etc.). Remotely sensed satellite imagery has been used to delineate management zones based on variation in soil organic matter content (Mulla and Schepers, 1997; Fleming et al., 2004; Christy, 2008). Dividing a field into a few relatively uniform management zones is a practical and cost-effective approach to site-specific crop management with current technology and price relationships.

Accurate estimation of site specific management zones which have homogenous soil properties and fertility levels, is a complex problem. Systems in related art utilize direct measurement of soil properties when ascertaining fertility zone boundaries, but the costs to measure soil characteristics at a spatial resolution from which management zones can be accurately determined are prohibitive. Related art systems do not address determining management zones using other indicators and/or indicators measured at a lower density.

Methods and systems in this disclosure improve current management zone delineation by combining vegetation indices derived from multi-year satellite imagery and ancillary data using spatial and multi-variate statistics. Ancillary data may include the following: weather data, soil physical and chemical properties, yield data, topographic data, and elevation derived products (e.g., slope, aspect, plan curvature, profile curvature, catchment area, topographic position index, etc.).

SUMMARY

This disclosure describes various methods and systems to facilitate generating a management zone map for an agricultural field using a multi-year approach to the process of dividing a field into management zones. The method, referred to as a refined average approach, uses three statistical moments to combine the vegetation indices, including but not limited to, Enhanced Vegetation Index (EVI2) and Normalized Difference Vegetation Index (NDVI) from multiple images into a single vegetation index (VI) image. The refined average image is simply an image obtained from the refined average of multiple VI satellite images from different years. Satellite images, such as, but not limited to, those from Landsat (30 m), RapidEye (5 m), or PlanetScope (3 m), are used to calculate a vegetation index. Each pixel in the refined average image is obtained by calculating the average of the corresponding pixels in the multiple VI images shifted slightly to the left or right based on the skewness and standard deviation of that pixel before normalization. The weighted natural breaks method is then used to classify the normalized refined average image and an elbow method is used to find an optimal number of zones. This method has several advantages, including robustness to outlier pixels, ease of interpretation, and the provision of continuous transitions.

According to one aspect, a method for determining management zones within an agricultural field is provided. The method includes selecting a plurality of remotely sensed images of the agricultural field wherein the plurality of remotely sensed images represent a plurality of growing seasons, each of the plurality of remotely sensed images having a vegetation index associated therewith. The method further includes generating a refined average image from the plurality of remotely sensed images of the agricultural field. The refined average image may optionally be normalized. The method further provides for applying a classification method to define management zones associated with the refined average image.

According to another aspect, a method for determining management zones within an agricultural field using a computing device is provided. The method includes selecting a plurality of remotely sensed images of the agricultural field wherein the plurality of remotely sensed images represent a plurality of growing seasons, calculating a vegetation index for each of the plurality of remotely sensed images of the agricultural field, and generating a refined average image from the plurality of remotely sensed images of the agricultural field using the vegetation index for each of the plurality of remotely sensed images of the agricultural field. The method further includes applying a classification method by the computing device to define management zones associated with the refined average image. The step of generating the refined average image at the computing device may be performed using average mean, standard deviation, and skewness to combine the vegetation index for each of the plurality of remotely sensed images of the agriculture field into the refined average image. The classification method may use a weighted natural breaks method. The method may use an elbow method to determine an optimal number of the management zones. Each pixel within the refined average image may be obtained by calculating an average of corresponding pixels in the plurality of remotely sensed images of the agricultural field, the corresponding pixels shifted slightly to the left or right based on skewness and standard deviation of that pixel before normalization. Each of the plurality of remotely sensed images may be automatically selected by the computing device such as based on correlation with yield data or by using a Normalized Difference Yellowness Index (NDYI). The method may further include filtering the refined average image prior to applying the classification model such as by using a Gaussian filter or a median filter. The method may further include normalizing a vegetation index for the refined average image prior to applying the classification model. The step of applying the classification method by the computing device to define management zones associated with the refined average image may be performed by applying weighted natural breaks to the refined average image after normalizing the vegetation index for the refined average image. The method may further include dissolving smaller polygons into larger polygons to reduce a number of the management zones. The vegetation may be an enhanced vegetation index 2 band (EVI2) vegetation index, a normalized difference vegetation index (NDVI), or other type of vegetation index. The remotely sensed images may be satellite images. The method may further provide for generating a prescription for the agricultural field for applying an agricultural input to the field based on the management zones.

According to another aspect, a system for determining management zones within an agricultural field is provided. The system includes a memory and at least one processor operably coupled to the memory and configured to: select a plurality of remotely sensed images of the agricultural field wherein the plurality of remotely sensed images represent a plurality of growing seasons, calculate a vegetation index for each of the plurality of remotely sensed images of the agricultural field, generate a refined average image from the plurality of remotely sensed images of the agricultural field using the vegetation index for each of the plurality of remotely sensed images of the agricultural field, and apply a classification method by the computing device to define management zones associated with the refined average image. To generate the refined average image at the computing device, the at least one processor may use average mean, standard deviation, and skewness to combine the vegetation index for each of the plurality of remotely sensed images of the agriculture field into the refined average image.

BRIEF DESCRIPTION OF DRAWINGS

The details of the present disclosure as a method may be garnered in part by study of the accompanying drawings, in which the figures are referred to in numerals and are as follows.

DETAILED DESCRIPTION

Accurately determining management zones for an agricultural field using only measured characteristics is a challenging problem. Measured soil characteristics are prone to error and are, often time, too sparse for accurate prediction of management zones having similar soil characteristics.

As described herein, systems and methods are used to facilitate generating a management zone map for an agricultural field using imagery and a multi-year approach to the process of breaking a field into management zones. A management zone map is a visual representation of different fertility zones in the agricultural field. A fertility zone is an area of the field having similar agronomic characteristics such that the expected fertility of the fertility zone is approximately the same. The method is an empirical method of management zone delineation, based on what occurred in the field over the past number of years.

The system generates a management zone map using a refined average approach. The method uses three statistical moments (average mean, standard deviation, and skewness) to combine the vegetation indices (e.g., EVI2 or NDVI) from multiple images into a single vegetation index image. The refined average image is simply an image obtained from the refined average of multiple vegetation index (VI) images from different years. Each pixel in the refined average image is obtained by calculating the average of the corresponding pixels in the multiple VI images shifted slightly to the left or right based on the skewness and standard deviation of that pixel before normalization. For more accurate and faster classification using the weighted natural breaks method, the final refined average image is normalized.

The method describes a zone delineation tool, which is used within a farm management platform application. An initial zone management layer is created that is representative of average field productivity. Agronomists can customize the zones by dissolving or merging them as required to create the most representative map. The map is then used to guide directive zone soil sampling. Results from the soil sampling are then used by the agronomist to create a recommendation or prescription for product application in each zone.

The novelty of the method lies within multi-temporal imagery. High temporal resolution satellite images are used to create a stack of images. This stack or layer, built to encompass a number of years of imaging, is averaged in a unique approach to zoning. Inconsistences in images are reduced by using a more representative average image to create management zones. The need for this technology arose from a realization that a single image was not representative of management zones. This method allows field management with respect to fertility and sprayer applications. Growers are ultimately provided with information that will increase their efficiency and productivity in their application processes, thus increasing profit.

There are several advantages to the method. First, the effects of outliers are mitigated in the refined average image. Second, at the end of the process, the VI intervals obtained for the zones are easy to interpret because they are continuous values from 1=low productivity to n=high productivity. Finally, the transition between the zones in the zone map is continuous, which is useful for applying the fertilizers because the method allows recommendations to avoid large increases/decreases in recommended product rates between zones of very different productivity levels (zone 1 vs. zone 6).

Image selection is a crucial task that may significantly alter the final zoning results. There are some criteria to follow; one example is that it is generally recommended to avoid images from legumes (i.e., lentils or peas), if possible, because above ground biomass does not necessarily translate to crop seed production. Canola is used early in the season as the leaves will show variability, but the flowering stage is typically avoided as it leads to zone inversion.

To avoid selecting images showing flowering, an index called the Normalized Difference Yellowness Index (NDYI) is computed (Sulik and Long, 2016):

$$\text{NDYI} = (\text{Green} - \text{Blue})/(\text{Green} + \text{Blue}) \tag{1}$$

Figure 1:
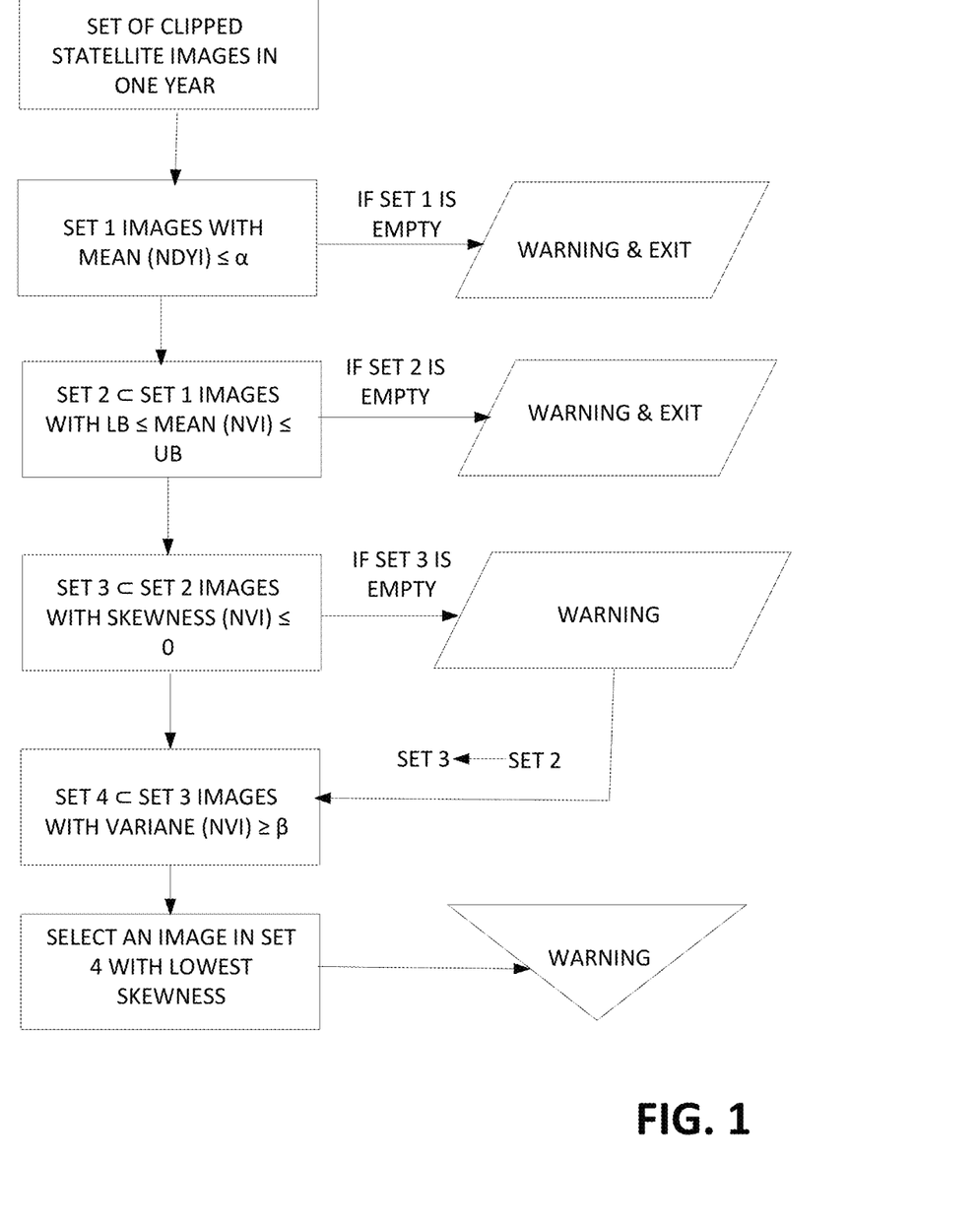
FIG. 1 is a flowchart of single image selection for each year. The input images should be cloud-shadow-haze free and within the growing seasons.

Images that have the highest correlation with yield data are good candidates for zoning. Setting a threshold for the NDYI index may prevent selecting such images whose Normalized Difference Vegetation Index (NDVI) or Enhanced Vegetation Index (EVI2, two bands) shows poor correlation with the yield data. Parameter α in Set 1 of FIG. 1 is empirically selected. If it is set to zero, there will be insignificant overall yellowness. The value of 0.01 will indicate minor yellowness, and 0.02 and 0.05 show some yellowness, which is useful in eliminating canola images during their peak flowering stages. EVI2 is recommended for image selection as it usually shows higher correlation with yield data compared to NDVI and also illustrates the vegetation variations better (Jiang et al., 2008). To select appropriate Lower Bound (LB) and Upper Bound (UB) for images between the seeding and harvest dates, a selected vegetation index (e.g., EVI2) is normalized. Images with normalized vegetation indices (NVI) between LB=0.45 and UB=0.8 are typically good as crops reach a stage when they are mature. Parameter β in Set 4 is calculated as the mean of the variances of NVIs in Set 3. If Set 3 is empty, then Set 2 will be used to determine β, after sending out a warning message.

Figure 2:
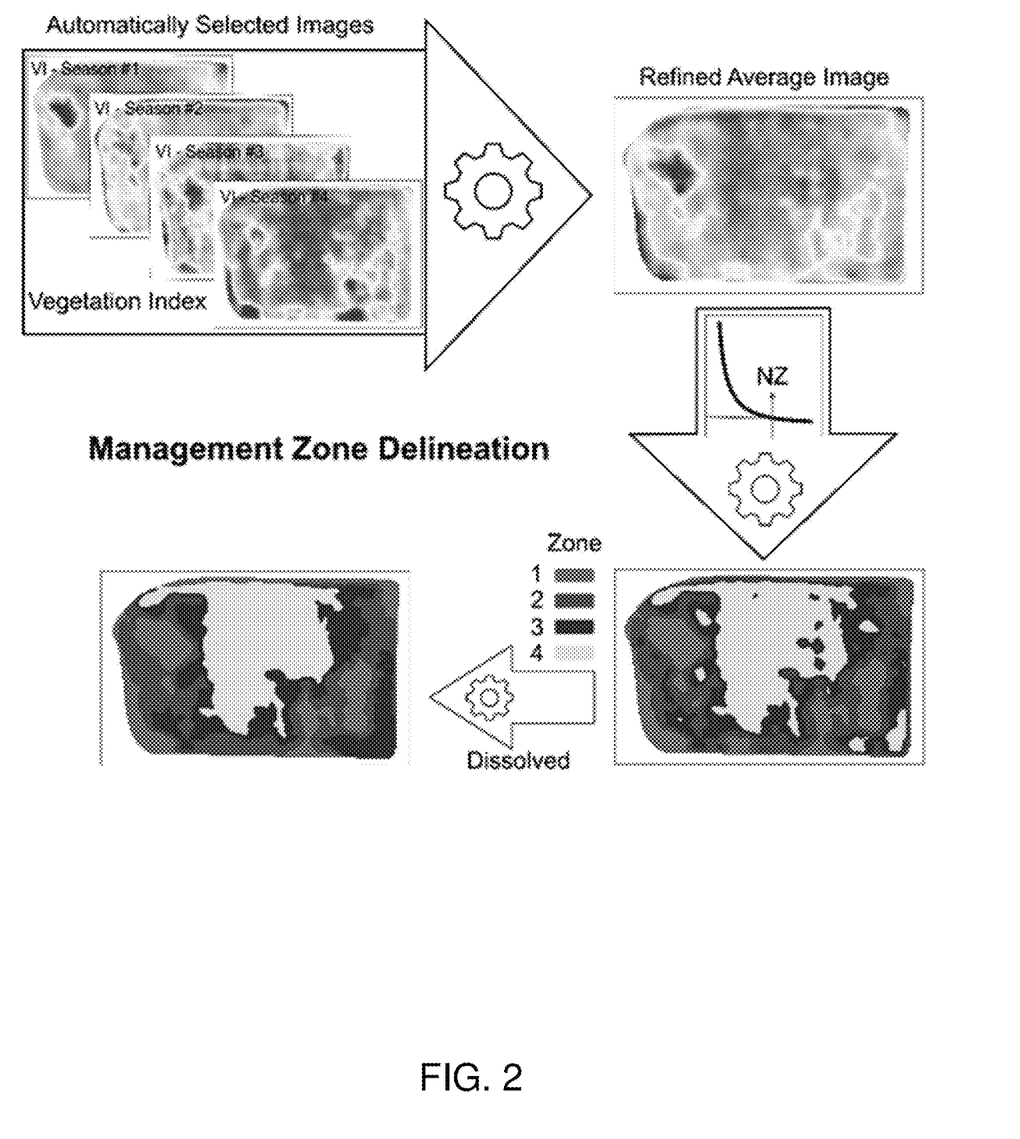
FIG. 2 is an illustration of a system environment for generating management zone delineation.

FIG. 2 illustrates a system environment for generating a fertility management zone map for a field, according to one example embodiment. Vegetation index images are automatically selected, a refined average image is produced, a number of zones (NZ) are created, and zones that are inadequately sized are dissolved into the nearest larger zones.

For a given field, two or more clipped images of the same size are selected. The images can be any earth-observation imagery and are typically satellite based. For some fields, due to prevailing conditions, there may not be a candidate image for zoning in a particular year, or there may only be one good image to use.

Once a minimum of one appropriate clipped satellite image has been selected, a unique vegetation index is calculated for each image. Users can select a vegetation index, such as EVI2, difference vegetation index (DVI), or NDVI. For this method, EVI2 is the default setting because it does not saturate in the high biomass areas the way the normalized vegetation index does and it is also soil adjusted (Rocha and Shaver, 2009).

With this method, a user can select either a median image, a simple average image, or a refined average image calculated for the selected vegetation index image in order to obtain a single refined vegetation index image. If the data has some undesired outliers, the median may be used. The median can be computed by listing all the numbers in ascending order and then locating the number in the center of the distribution.

A simple average image is computed by summing up all the values and dividing the sum by the total number of values. If the data is mostly uniform, then a simple average can be used.

The refined average is a combination of median and simple average that mitigates the outlier effects. The refined average image is calculated with a series of computations. First, the simple average of the values (μ) is computed, followed by the standard deviation of the values (σ), then the skewness of the values (skew), and finally, a threshold (T) for outlier mitigation is chosen, which is a negative number [−1,0] to shift the final value toward the centre (hump) of the distribution:

$$\text{Refined Average} = \mu + (T)(\sigma)(\text{Skew}) \tag{2}$$

$$x = [x_1, \ldots, x_n] \tag{3}$$

$$\mu = \frac{\sum_{i=1}^{n} x_i}{n}, \tag{4}$$

$$\sigma^2 = \frac{\sum_{i=1}^{n} (x_i - \mu)^2}{n}, \tag{5}$$

$$\text{Skew} = \frac{\sum_{i=1}^{n} (x_i - \mu)^3}{n\sigma^3}, \tag{6}$$

$$\text{Refined Average} = \mu + (T)(\sigma)(\text{Skew}) = \mu + T \frac{\sum_{i=1}^{n} (x_i - \mu)^3}{\sum_{i=1}^{n} (x_i - \mu)^2} \tag{7}$$

For arrays of one or two images, the median, simple average, and refined average are all equal to the simple average. The methods are thus identical when there are only one or two images. When the array is normally distributed (without outliers), all methods return the simple average. The skewness of a normally distributed data set is zero; therefore, the refined average is the simple average regardless of the threshold. When the data are skewed and users do not have information regarding anomalies in certain years but still want to consider those years, the refined average image with a threshold equal to −0.25 is recommended to slightly mitigate the effect of the outliers. The threshold for the refined average method depends on the number of images and outliers. Empirically, a value of −0.25 usually provides good results for centers of distributions of vegetation index images.

To produce smoother and cleaner zones, a Gaussian or Median filter may be applied to the refined average image. Filtering is generally not recommended, unless the refined image has issues, such as systematic noise, random noise, or sharp anomalies. Systematic noise can be human made, such as pipeline or truck footprints, or areas without seeding in certain years. The user may select images with histograms that are highly skewed or images with a large number of zones, which would be more than nine zones. In these cases, there may be many small polygons in the final zoning results manifesting as random noise or sharp anomalies. Filtering the image using a Gaussian or Median filter will result in a cleaner image.

The refined vegetation index image, whether filtered or not, is normalized to obtain a normalized vegetation index (NVI) image with values from zero to one. The normalization is optional, and it is set as the default for higher accuracy of classification.

$$\text{NVI} = (\text{VI} - \min(\text{VI}))/(\max(\text{VI}) - \min(\text{VI})) \tag{8}$$

The next step is to apply a classification scheme, such as the Weighted Natural Breaks (WNB), to the normalized vegetation image to delineate management zones. This step minimizes the variability within each zone while it maximizes the variability between the zones. It is identical to Jenk's Natural Breaks, but it is much faster in application, allowing for quicker answers. An elbow method based on the sum of Squared Deviation Between Classes (SDBC), then determines the optimal number of zones. The thresholds for the elbow method used for the automated number of zones are 20% (total sum of deviations) and 2% (differences). This usually provides 4 to 6 zones on a 160-acre parcel of land.

The user may choose to dissolve smaller polygons, with user-defined thresholds, into the neighboring larger size polygons using the sieve function. The choice can vary based on user preferences and field anomalies. The difference between the zoning results before and after dissolving provides the opportunity to consider alert areas, where the histograms of zones overlap each other. These alert areas can then become areas where in-field sampling for soil nutrients are avoided because they are not representative of the larger zone.

Additional datasets can be used to delineate management zones and evaluate the final zoning results. Some datasets that play significant roles include, but are not limited to, digital elevation models, slope data sets, soil electrical conductivity, pH, organic matter, and yield data sets. Multi-year satellite images and a digital elevation model with its derivatives, such as the Topographic Position Index are used to delineate management zones (De Reu et al., 2013). Elevation models are incorporated into areas of the fields that are not perfectly described by satellite image vegetation index maps and are subject to change depending on soil moisture and precipitation.

A significant correlation between the digital elevation model and yield or satellite imagery for each year is determined and new weight functions can be defined using a digital elevation model. Digital elevation values are normalized from 0 to 1, as are the yield and slope data using a classification method. These methods include natural breaks applied on the refined average image, Fuzzy c-mean, or K-means.

Figure 3:
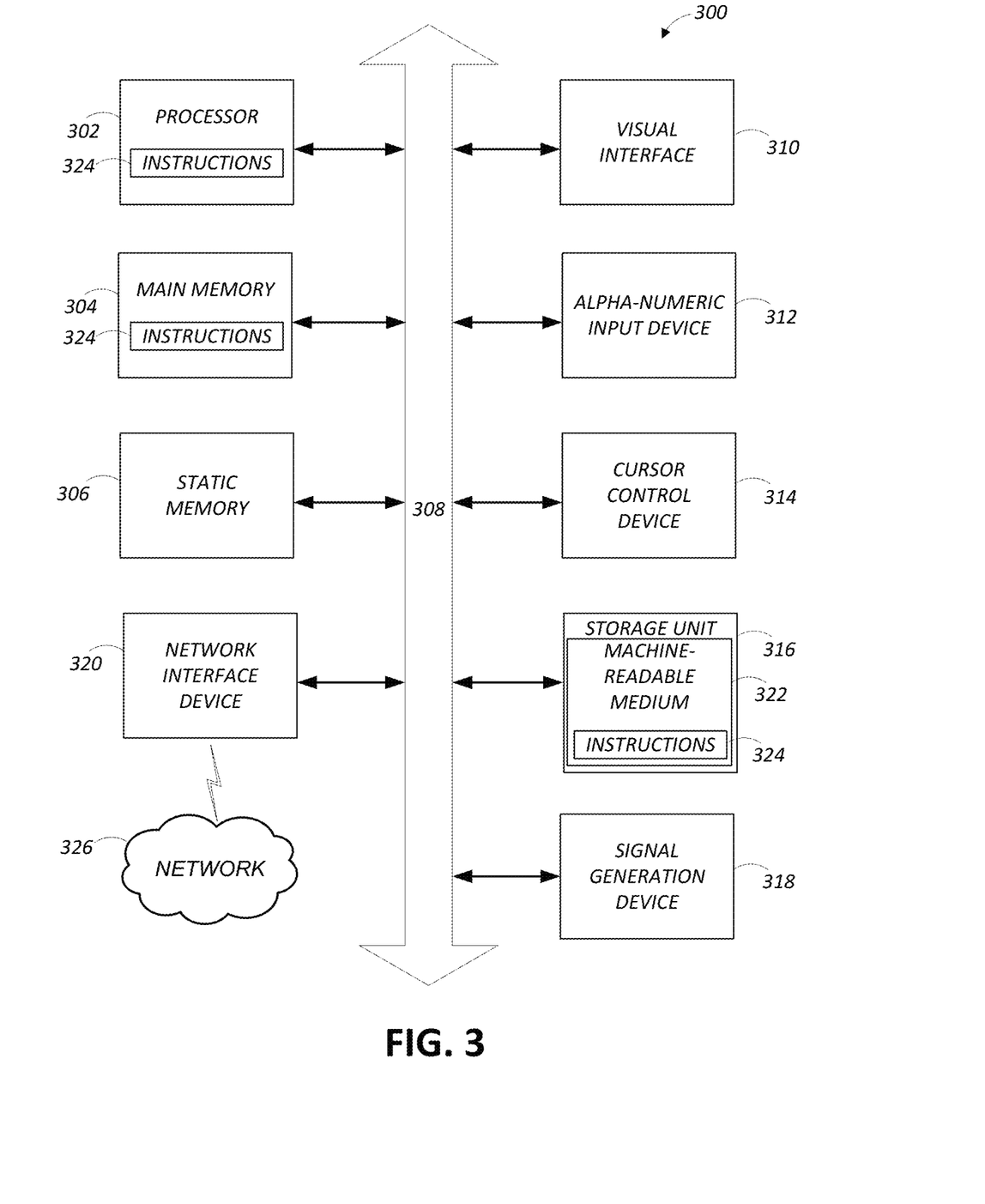
FIG. 3 is a diagram of one example of a computing system which may be used.

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alpha-numeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Figure 4:
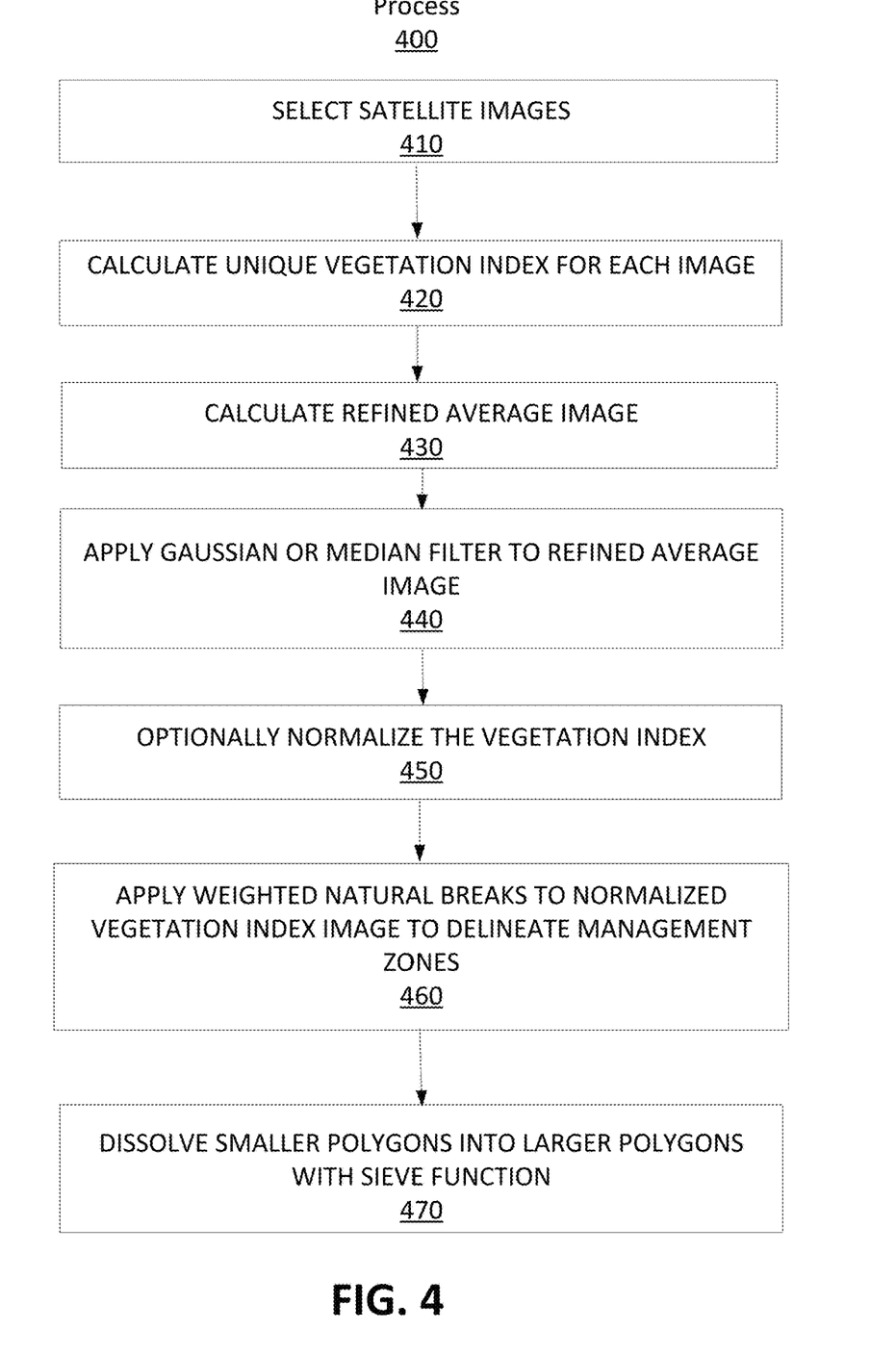
FIG. 4 is an overview of the process to create a single vegetation index from multiple images.

FIG. 4 illustrates the overall process involved in creating a single vegetation index from multiple images. Images can be any earth-observation imagery but are typically satellite based. For a given field, two or more satellite images with the same size are selected 410. For some fields, due to prevailing conditions, there may not be a candidate image for zoning in a particular year, or there may only be one good image to use. The process of selecting images is done by calculating appropriate indices and performing robust statistical analyses as described in FIG. 1.

A unique vegetation index for each image is calculated 420, typically with Enhanced Vegetation Index 2. For this method, EVI2 is the default setting because it does not saturate in the high biomass areas the way the normalized vegetation index does and it is also soil adjusted.

This step is followed by calculation of a refined average image 430 for selected vegetation index images to obtain a single refined vegetation index image. With this method, the effect of outliers in an image is mitigated. Refined average is computed by taking into account the simple average of the values, the standard deviation of the value, the skewness of the values, and the chosen threshold for outlier mitigation.

To produce smoother and cleaner zones, a Gaussian or Median filter may be applied to the refined average image 440. This filtering is only done if there is systematic noise, salt and pepper noise, or sharp anomalies. After finding the refined image, filtering can produce a smoother image before classification is performed.

Next is an optional normalization of the refined vegetation image 450 to obtain a normalized vegetation index image. This normalization provides higher accuracy of classification. A normalized vegetation index image is found with values from zero to one.

Once a normalized vegetation index image is acquired, a Weighted Natural Breaks is applied to this image to delineate management zones 460. An elbow method based on the sum of squared deviation between classes (SDBC) will determine the optimal number of zones.

Finally polygons with smaller areas may be dissolved into neighboring larger polygons using the sieve function 470 to finalize the management zones. A user can select the size of the area to dissolve.

With this method, growers are provided with information that can increase the efficiency and productivity of their application process, ultimately improving profit margins. Most often, the zone delineation tool is used by an agronomist within a farm management platform to create a map representative of average field productivity. Typically, an agronomist customizes the zones by dissolving or merging them to create the most representative map, which then guides physical zone soil sampling. Agronomists use the sampling results to create recommendations and prescriptions to the grower for product application in each derived zone. The method allows better field management of fertility and sprayer applications.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for systems, methods, and apparatus for refined average for zoning and determining management zone delineation maps for agricultural fields. For example, differences in the manner in which images are obtained are contemplated including satellite imagery, aerial imagery from drones, or other types of imagery. Variations in specific image processing algorithms are contemplated. Variations in the types of vegetation indices used are contemplated. Various steps described in processing are optional and need not necessarily be performed in a particular embodiment. Other variations are contemplated as may be appropriate based on a particular crop, particular images used, available computing resources, or other factors. Thus, while particular embodiments and applications have been illustrated and described, it is to be understood that the disclosed embodiments are not limited to the precise methodologies disclosed herein. Various modifications, changes and variations, which will be apparent to those skilled in the art, may be made in the arrangement, operation and details of the method and apparatus disclosed herein without departing from the spirit and scope of the disclosure.

REFERENCES

The following references are hereby incorporated by reference in their entireties.

Christy C. D. 2008. Real-time measurement of soil attributes using on-the-go near infrared reflectance spectroscopy. Comput Electron Agric 61:10-19.

De Reu, J., Bourgeois, J., Bats, M., Zwertvaegher, A., Gelorini, V., De Smedt, P., Chu, W., Antrop, M., De Maeyer, P., Finke, P., Van Meirvenne, M., Verniers, J., and Crombe, P., 2013. Application of the topographic position index to heterogeneous landscapes, Geomorphology, 186, 39-49.

Fleming, K. L., Heermann, D. F., and Westfall, D. G. 2004. Evaluating soil color with farmer input and apparent soil electrical conductivity for management zone delineation. Agron. J. 96:1581-1587.

Jiang, Z., Huete, A. R., Didan, K., and Miura, T. 2008. Development of a two-band enhanced vegetation index without a blue band, Remote Sensing of Environment, 112 (10), 3833-3845.

Mulla, D. J. 1991. Using geostatistics and GIS to manage spatial patterns in soil fertility, pp. 336-345. In: G. Kranzler (ed.), Automated Agriculture for the 21st Century. American Society of Agricultural Engineers, St. Joseph, Mich.

Mulla, D. J. 1993. Mapping and managing spatial patterns in soil fertility and crop yield, pp. 15-26. In: P. Robert, W. Larson, and R. Rust (eds.), Soil Specific Crop Management. American Society of Agronomy, Madison, Wis.

Mulla, D. J. and Schepers, J. S. 1997. Key processes for site-specific soil and crop management. p. 1-18. In F. J. Pierce and E. J. Sadler (ed.) The State of Site-Specific Management for Agriculture. ASA, CSSA, SSSA, Madison, Wis.

Rocha, A. V., and Shaver, G. R., 2009. Advantages of a two band EVI calculated from solar and photosynthetically active radiation fluxes, Agricultural and Forest meteorology 149 (9), 1560-1563.

Sulik, J. J., and Long, D. S., 2016. Spectral considerations for modeling yield of canola, Remote Sensing of Environment, 184, 161-174.

What is claimed is:

1. A method for determining management zones within an agricultural field using a computing device, the method comprising:
   selecting a plurality of remotely sensed images of the agricultural field wherein the plurality of remotely sensed images represent a plurality of growing seasons;
   calculating a vegetation index for each of the plurality of remotely sensed images of the agricultural field;
   generating a refined average image from the plurality of remotely sensed images of the agricultural field by using the vegetation indexes to calculate an average mean value, a standard deviation value and a skewness value for corresponding pixels of the plurality of remotely sensed images of the agricultural field and calculating the refined average image using the calculated average mean values, the calculated standard deviation values and the calculated skewness values;
   applying a classification method by the computing device to define management zones associated with the refined average image.

2. The method of claim 1 wherein the classification method comprises a weighted natural breaks method.

3. The method of claim 2 further comprising applying an elbow method to determine an optimal number of the management zones.

4. The method of claim 1 wherein each pixel within the refined average image is obtained by calculating the average mean values of the corresponding pixels in the plurality of remotely sensed images of the agricultural field, then shifting the calculated pixel within the refined average image slightly to the left or right based on the calculated skewness value and the calculated standard deviation value of that pixel within the refined average image before normalization.

5. The method of claim 1 wherein each of the plurality of remotely sensed images are automatically selected by the computing device.

6. The method of claim 5 wherein each of the plurality of remotely sensed images are automatically selected by the computing device based on correlation with yield data.

7. The method of claim 6 wherein each of the plurality of remotely sensed images are automatically selected by the computing device using a Normalized Difference Yellowness Index (NDYI).

8. The method of claim 1 further comprising filtering the refined average image prior to applying the classification model.

9. The method of claim 8 wherein the filtering is performed using a Gaussian filter.

10. The method of claim 8 wherein the filtering is performed using a median filter.

11. The method of claim 1 further comprising normalizing a vegetation index for the refined average image prior to applying the classification model.

12. The method of claim 11 wherein the applying the classification method by the computing device to define management zones associated with the refined average image is performed by applying weighted natural breaks to the refined average image after normalizing the vegetation index for the refined average image.

13. The method of claim 12 further comprising dissolving smaller polygons into larger polygons to reduce a number of the management zones.

14. The method of claim 1 wherein the vegetation index is an enhanced vegetation index 2 band (EVI2) vegetation index.

15. The method of claim 1 wherein the vegetation index is a normalized difference vegetation index (NDVI).

16. The method of claim 1 wherein the remotely sensed images are satellite images.

17. The method of claim 1 further comprising generating a prescription for the agricultural field for applying an agricultural input to the field based on the management zones.

18. The method according to claim 4 further comprising calculating the refined average image by applying an outlier mitigation constant to the calculated skewness value and the calculated standard deviation value for each pixel within the refined average image so as to mitigate an effect of outlier pixels on the calculation of the refined average image.

19. A system for determining management zones within an agricultural field, the system comprising:
   a memory;
   at least one processor operably coupled to the memory and configured to:
   (i) select a plurality of remotely sensed images of the agricultural field wherein the plurality of remotely sensed images represent a plurality of growing seasons;
   (ii) calculate a vegetation index for each of the plurality of remotely sensed images of the agricultural field;
   (iii) generate a refined average image from the plurality of remotely sensed images of the agricultural field by using the vegetation indexes to calculate an average mean value, a standard deviation value and a skewness value for corresponding pixels of the plurality of remotely sensed images of the agricultural field and calculating the refined average image using the calculated average mean values, the calculated standard deviation values and the calculated skewness values; and
(iv) apply a classification method by the computing device to define management zones associated with the refined average image.

20. A method for determining management zones within an agricultural field using a computing device, the method comprising:
selecting a plurality of remotely sensed images of the agricultural field wherein the plurality of remotely sensed images represent a plurality of growing seasons;
calculating a vegetation index for each of the plurality of remotely sensed images of the agricultural field;
generating a refined average image from the plurality of remotely sensed images of the agricultural field using the vegetation index for each of the plurality of remotely sensed images of the agricultural field;
normalizing a vegetation index for the refined average image;
applying a classification method by the computing device to define a first set of management zones associated with the refined average image after normalizing the vegetation index for the refined average image; and
reducing a number of the management zones by dissolving smaller polygons within the refined average image into larger polygons within the refined average image to define a second set of management zones different from the first set of management zones.

* * * * *